O. WINKELMILLER & E. C. BERNERS.

GLUE AND MUCILAGE RECEPTACLE.

APPLICATION FILED FEB. 5, 1916.

Reissued Apr. 18, 1916. 14,115.

Inventors

Oscar Winkelmiller

Edward C. Berners

By Geo. H. Young

Attorney

Witness:

Emma B. Young

UNITED STATES PATENT OFFICE.

OSCAR WINKELMILLER AND EDWARD C. BERNERS, OF TWO RIVERS, WISCONSIN.

GLUE AND MUCILAGE RECEPTACLE.

14,115. Specification of Reissued Letters Patent. Reissued Apr. 18, 1916.

Original No. 1,048,255, dated December 24, 1912, Serial No. 639,207. Application for reissue filed February 5, 1916. Serial No. 76,480.

*To all whom it may concern:*

Be it known that we, OSCAR WINKELMILLER and EDWARD C. BERNERS, citizens of the United States, residing at Two Rivers, in the county of Manitowoc and State of Wisconsin, have invented new and useful Improvements in Glue and Mucilage Receptacles, of which the following is a specification.

The primary object of the present invention resides in the provision of a receptacle for containing mucilage or the like whereby the contents may be distributed therefrom in a ready and convenient manner, and wherein means is provided for an automatic resealing of the contents between successive distributing operations.

Another object resides in the provision of a holder for the receptacle proper which forms a protective casing therefor, but which is readily removable to provide for heating the receptacle at desired times whereby a more ready flow of the contents thereof may be procured.

For the purpose mentioned, use is made of a receptacle, a distributer for engagement with the open end of the receptacle and adapted to constitute a closure, the said distributer being provided with slots for permitting the exit of a fluid in the receptacle, a container adapted to contain the receptacle and act as a holder and retaining means for releasably retaining the receptacle within the container.

Reference is to be had to the accompanying drawings constituting a part of this specification, in which similar characters of reference denote corresponding parts in all the views, and in which—

Figure 1:
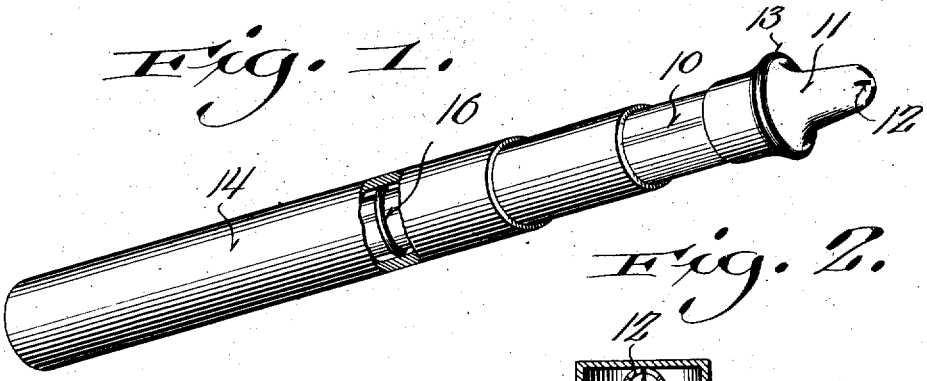
Figure 2:
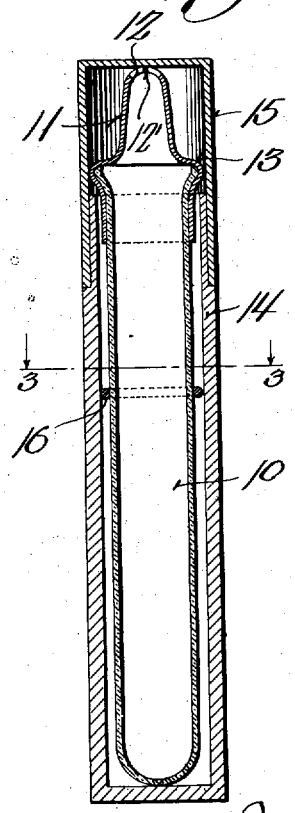
Figure 3:
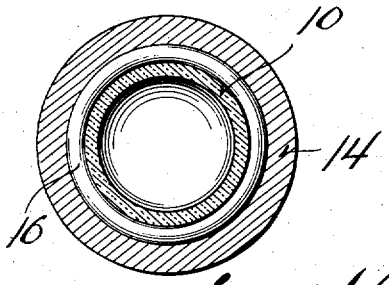
Figure 4:
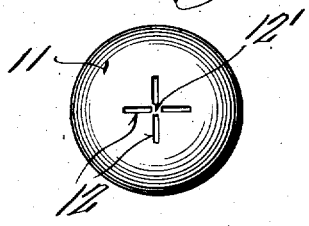

Figure 1 is a perspective view showing the receptacle partially withdrawn from the container, parts of the container being broken away to disclose the retaining means. Fig. 2 is a vertical longitudinal sectional view showing the receptacle within the container, with a cover attached to the container. Fig. 3 is a horizontal transverse sectional view taken on the line 3—3 in Fig. 2, looking in the direction of the arrow. Fig. 4 is a plan view of the brush body showing the slits therein.

Referring more particularly to the views, we provide a receptacle 10 having preferably a tubular formation and connected with the open end of the receptacle 10, to normally close the same, is a distributer 11, preferably consisting of a flexible rubber hood, the said distributer being provided with a plurality of spaced slits 12 adapted to permit the exit of a fluid from the receptacle 10, and the mouth of this hood, or nipple, is enlarged as indicated at 13 whereby it may fit over the mouth end of the receptacle 10 to secure the hood or nipple thereon.

The receptacle 10 is adapted to repose within a container 14 provided with a cover 15 and mounted to encircle the receptacle 10 is a circular retainer 16, preferably made of rubber or a similar flexible material, the said retainer being adapted to engage the inner periphery of the container 14 when the receptacle is disposed within the container.

In the use of our device, the retainer 16 is first mounted to encircle the receptacle and the receptacle is then disposed within the container 14 as shown in Fig. 2, the receptacle being so positioned in the container 14 that the distributer 11 will extend a distance beyond the upper edge of the container, the cover 15 being provided to inclose the distributer when the same is not in use. Now assuming that the receptacle 10 is filled with a mucilage, the slits 12 in the distributer 11 are covered with a sealing substance such as wax or paraffin and after the receptacle 10 has been positioned in the container 14 as mentioned, the cover 15 is applied to the container 14 and the device is then ready for the commercial market.

When it is desired to use the mucilage contained in the receptacle 10, the cover 15 is first removed and the device and the sealed slots are broken open to thus permit the fluid to flow outwardly from the receptacle through the slits 12, our device being used in a manner similar to that of an ordinary brush to spread the mucilage over an article upon which the same is to be used. When a sufficient quantity of mucilage has been used, the cover 15 is reapplied to the container 14 to inclose the distributer 11 and as will be readily understood the slits 12 will soon become sealed, owing to a small amount of mucilage remaining on the distributer and which will become hard, thus sealing the slits 12 in a manner similar to that of the paraffin or wax heretofore mentioned.

When it is desired to remove the receptacle 10 from the container 14 for the purpose of heating the receptacle to thin the mucilage contained therein, the receptacle 10 can be easily pulled outwardly from the container 14 although the retainer 16 will normally tend to frictionally retain the receptacle 10 within the container 14 and when our device is used in the manner described heretofore the container 14 will act as a handle for the distributer 11, as will be readily understood.

As is more particularly shown in Fig. 4, the slits 12 of the distributer 11 are disposed in its closed end and arranged radially with respect to its axis. Thus alined slit portions are interrupted by a common web portion 12′, whereby the surface of the distributer is materially strengthened and a more satisfactory and even flow of the fluid is provided for. The particular advantage of these radially disposed slits is that in whichever manner the end of the distributer is pressed on the surface, one or more of the slits will be bowed open to permit a limited flow of fluid and at the same time each of the slits is of such small size as to provide for a sufficient closing of the slit by the resilient action of the rubber, to efficiently reseal the distributer by the mucilage remaining on the walls of the slits.

As the receptacle would in the commercial application of the device be naturally of a somewhat fragile material, the container serves to protect the receptacle against breakage as well as to form a handle therefor.

We claim:

1. A receptacle of the class described comprising a body portion, a resilient hood member at one end of the body having a substantially hemispherical closed end and being provided in said end with a plurality of slits radially diverging from a central web portion.

2. As an article of manufacture the combination with a container, of a receptacle adapted to contain a fluid and removably mounted within the container, a retainer mounted to encircle the said receptacle and adapted to engage the container when the receptacle is disposed therein to frictionally retain the receptacle in engagement with the container, a slotted distributer secured to the open end of the receptacle to normally close the same and a cover for removable engagement with the container and adapted to inclose the said distributer.

3. In combination, a container, a receptacle adapted to contain a fluid and removably mounted within the container, a retainer mounted to encircle the said receptacle and adapted to engage the container when the receptacle is disposed therein to frictionally retain the receptacle in engagement with the container and a flexible distributer mounted to close the open end of the said receptacle, the said distributer being provided with spaced slits disposed at relatively right angles in the upper end of the said distributer.

In testimony that we claim the foregoing as our own, we have hereto affixed our signatures in the presence of two witnesses.

OSCAR WINKELMILLER.
EDWARD C. BERNERS.

Witnesses:
JOSEPH KLEISS, Jr.,
GEO. H. DICKE.